Patented July 29, 1930

1,771,628

UNITED STATES PATENT OFFICE

DAVE HIRSTEL, OF SAN FRANCISCO, CALIFORNIA, ASSIGNOR TO JENNIE BRANDIES, OF SAN FRANCISCO, CALIFORNIA

METHOD OF MANUFACTURING SYNTHETIC CHLORIDES

No Drawing.      Application filed March 9, 1925. Serial No. 13,955.

This invention relates to a method of manufacturing synthetic chlorides and particularly to a method of manufacturing magnesium chloride as a by-product of salt cake or sodium sulphate.

The purpose of the present invention is to provide a method of manufacturing synthetic chlorides, such as magnesium chloride, calcium chloride, barium chloride and the like, by a simple efficient process which will reduce their manufacture to the status of by-products of the so-called salt cake process, the object being first, to produce synthetic chlorides; secondly, to produce chlorides of uniform purity, strength, etc., and third, to eliminate the production of hydrochloric acid during the manufacture of salt cake.

Hydrochloric acid is obtained in fairly large quantities as a by-product in the manufacture of salt cake or sodium sulphate. The manufacture is usually carried out by placing ordinary salt in a pan set in brickwork and heated by direct firing. An equal weight of concentrated sulphuric acid is added from a leaden cistern, when the following chemical reaction takes place:

The hydrochloric acid that escapes through a flue in the dome of the brickwork covering the pan is absorbed by water. The hot mass is then raked into a muffle furnace, where the reaction is completed at a higher temperature:

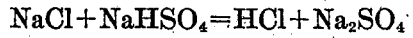

The additional hydrochloric acid liberated escapes through a separate flue and, after being cooled and washed, is also absorbed by water in special absorbing devices made of acid-proof materials.

One of the features of the present invention as already stated is to eliminate the production of aqueous hydrochloric acid as a by-product of the salt cake process by substituting therefor a process for the manufacture of synthetic chlorides. This is obviously important as it helps to prevent overbalancing of the manufacture of hydrochloric acid and at the same time permits the production of synthetic chlorides and particularly synthetic magnesium chloride.

Another purpose of the present invention, as previously stated, is therefore that of producing chlorides and particularly magnesium chlorides which are synthetic and which will have a definite composition, strength, purity and known characteristics.

For the purpose of clearly describing the process, reference will be made to the accompanying drawing, which is a diagrammatic view of one form of apparatus which may be employed.

Referring to the drawing, A indicates a large semispherical pan set in brickwork, as indicated at 2, and heated by direct firing, for instance, by an oil burner 3. The brickwork completely encloses the pan and the dome thereof is provided with a flue 4 through which hydrochloric acid fumes will escape, as will hereinafter be described. The brickwork is extended or continued as indicated at 5 to form a muffle furnace generally indicated at 6. This furnace is maintained at a higher temperature, for instance, by means of one or more oil burners, as indicated at 7, and the dome of the muffle furnace is also provided with a flue as indicated at 8 through which the hydrochloric acid fumes liberated by the final reaction escape. The flues 4 and 8 are connected with a common flue 9 and this terminates in a gooseneck 10 which is disposed directly above a circulating tank 11. This tank is adapted to contain water and other materials as will hereinafter be described and continuous circulation and agitation are maintained by a centrifugal pump or the like as indicated at 12, the suction side of the pump being connected with the bottom of tank 11 by means of a pipe 13. The discharge side of the pump is connected with a pipe 14 and this terminates in a spray nozzle 15 which cooperates with the gooseneck 10.

The pipe 14 is provided with a T 16 and this is connected by a pipe 17 with a filter 18, and this is in turn connected with an evaporating pan 19, which will hereinafter be described. Pipe 17 is also provided with a valve, as shown at 20, so that the liquid in the tank 11 may be discharged through the filter and into the evaporating pan or circulated through the spray nozzle as desired.

The remaining apparatus required is the tank 22, which is adapted to contain water and powdered magnesium oxide or other materials, and means in the form of an agitator 23 are provided for maintaining the powdered magnesium oxide in constant agitation and suspension. Tank 22 is connected with tank 11 through means of a pipe 24 and a valve 25 is provided to regulate the flow of liquid from tank 22 to tank 11.

The first part of the apparatus described, to-wit, the pan A, the muffle furnace 6, the flues, 4, 8 and 9, etc., is old and well known to the salt cake industry. The remaining part of the apparatus described is, however, new and is the part of the apparatus which is depended upon for the manufacture of the chlorides as will hereinafter be described.

In carrying out the improved method of manufacturing synthetic chlorides, I utilize the present salt cake process, as heretofore described, for the purpose of generating hydrochloric acid gas, but I do not absorb this gas in cold water to convert the gas into aqueous hydrochloric acid or muriatic acid of commerce. Instead thereof, I conduct the hydrochloric acid gases liberated by the several reactions through the flue 9 and deliver them to the circulating tank 11. The whole process is carried out by placing, for instance, one-half ton of salt (NaCl) in the semispherical pan A which is supported in the brickwork and heated by direct firing. An equal weight of concentrated sulphuric acid is added from a leaden cistern indicated at 30, when the following chemical reaction takes place:

$$2NaCl + H_2SO_4 = NaHSO_4 + HCl + NaCl$$

The hydrochloric acid liberated during this reaction escapes through the flue 4 in the dome of the brickwork that covers the pan and it is thereby directed into the flue 9. The hot mass of material produced by this reaction is next raked or otherwise transferred into the muffle furnace 6, where the reaction is completed at a higher temperature:

$$NaCl + NaHSO_4 = HCl + Na_2SO_4$$

The additional hydrochloric acid liberated by the last reaction escapes through the flue 8 and as a result also enters the flue 9. The tank 11 contains water and an oxide in a powdered or granulated form, for instance, magnesium oxide, and this oxide is retained in suspension by agitating and circulating the water, this being accomplished by means of the pump 12 and the spray nozzle 15.

The spray nozzle terminates at a predetermined point above the end of the gooseneck 10, which forms a final outlet for the flue 9 and as such produces a suction or partially evacuated condition in the flue, thereby promoting the flow or escape of gases therethrough. The spray produced by the nozzle also causes an intimate mixing action of the gases with the water and magnesium oxide contained, and as the gases have a great affinity for the oxide, reaction immediately takes place and magnesium chloride is formed; that is, as the magnesium oxide content of the water is being reacted upon by the hydrochloride acid gas, just in that proportion is magnesium chloride being formed in accordance to the chemical reaction expressed by the following formula:

$$MgO + 2HCl + 6xH_2O = MgCl_2.6H_2O + xH_2O$$

If magnesium carbonate is employed as a reacting agent, the following reaction takes place:

$$MgCO_3 + 2HCl + 6xH_2O = MgCl_2.6H_2O + CO_2 + xH_2O$$

The water in the tank is, of course, continuously circulated by the pump and as the hydrochloric acid gas is gradually combining with the oxide or carbonate contained, the solution becomes more and more concentrated with magnesium chloride. The solution also becomes gradually heated by the hot hydrochloric acid gas and thus positively prevents the formation of any aqueous hydrochloric acid.

The process is carried on until a desired concentration or specific gravity of magnesium chloride is obtained. Such concentration is regulated by proportioning the correct amount of the carbonate or oxide of magnesium held in suspension in the water at the beginning of the process, or it may be regulated by the addition of oxides or carbonates from the tank 22. The process may be continuous or intermittent as desired; that is, after the solution in tank 11 has reached a predetermined degree of concentration, valve 20 may be slightly opened and liquid will thus be continuously discharged through the filter and delivered to the evaporating pan, or a predetermined amount of solution may be circulated until a predetermined degree of concentration is obtained and the entire amount may then be run through the filter and delivered to the evaporating pan.

Any sediment in the liquid magnesium chloride is removed by the filter or settled out, and it is therefore obvious that the clear aqueous solution of chloride obtained can be readily concentrated by the evaporator to any desired specific gravity, which, upon cooling, will produce pure crystals of evaporation of magnesium chloride. If desired, the concentration may be carried further, in which case the chloride upon cooling will solidify in the form of fused crystals.

The process as described has been particularly directed to the manufacture of magnesium chloride, but it is obvious that it applies to the manufacture of chlorides of the metal bases or any other compound which may be formed by subjecting the same in the manner here described to the action of hydrochloric acid gas.

It happens that most of the chloride-forming materials are insoluble in water and other solvents, but there are a few exceptions. For instance, caustic potash is soluble in water and can therefore be converted into potassium chloride according to the following formula:

$$KOH + HCl = KCl + H_2O$$

Hence, if it is desired to manufacture potassium chloride by the present process, it is only necessary to dissolve caustic potash in water and then to subject it to the action of hydrochloric acid gas by merely passing the fumes liberated from the salt cake process through the water containing the caustic potash in solution.

Having thus described my invention, what I claim and desire to secure by Letters Patent is—

In a method of the character described, the steps which consist in reducing magnesium oxide to a powdered form, mixing the powdered magnesium oxide with water and maintaining it in suspension therein and in passing hydrochloric acid gas through the water so as to subject the powdered magnesium oxide suspended therein to the direct action of the hydrochloric acid gas.

DAVE HIRSTEL.